Sept. 13, 1932.    B. W. JONES    1,877,667
CONTROL SYSTEM
Filed Nov. 1, 1928
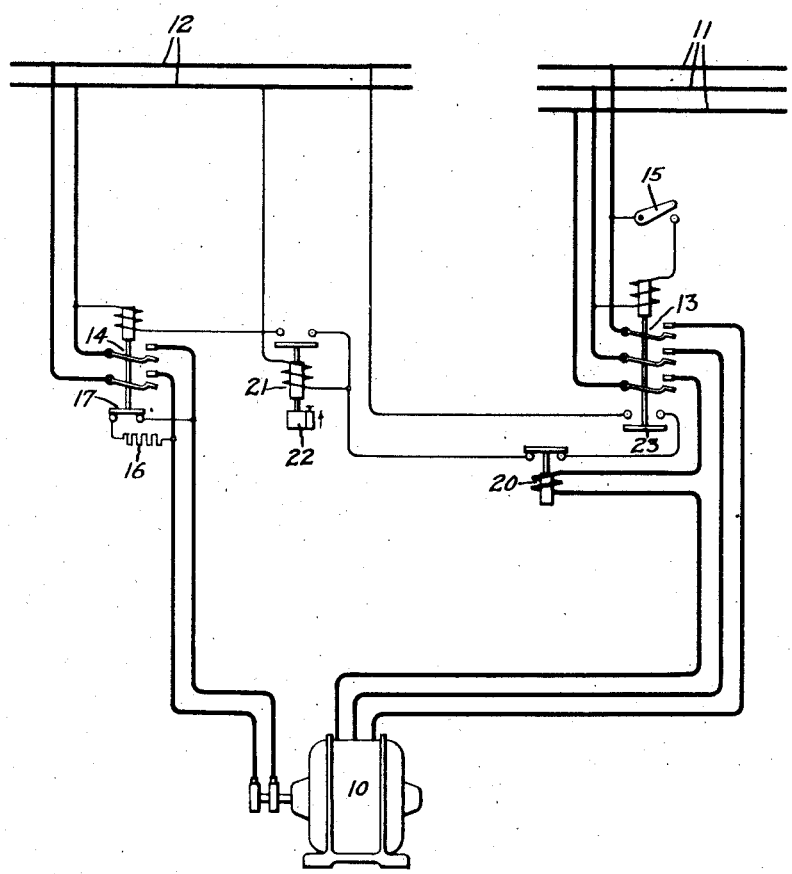
Inventor:
Benjamin W. Jones,
by Charles E. Tullar
His Attorney.

Patented Sept. 13, 1932

1,877,667

UNITED STATES PATENT OFFICE

BENJAMIN W. JONES, OF SCHENECTADY, NEW YORK, ASSIGNOR TO GENERAL ELECTRIC COMPANY, A CORPORATION OF NEW YORK

CONTROL SYSTEM

Application filed November 1, 1928. Serial No. 316,521.

My invention relates to the control of electric motors, more particularly to the control of alternating current synchronous motors, and has for its object the provision of a simple and efficient system of control for a synchronous motor whereby the excitation of the motor field windings will be controlled in such manner that safe and efficient operation of the synchronous motor will be assured.

It has long been general practice to start a synchronous motor substantially as an induction machine, the field windings of the motor being disconnected from their exciting source during the starting period. In some instances the field circuit is left open and in other instances the circuit is connected in a local circuit with a suitable discharge resistance. In either case, the field windings are connected to a suitable source of excitation when the motor has reached substantially synchronous speed.

It will be understood, however, that it is very necessary to apply the excitation at the proper time or else serious detrimental results will follow. For instance should the excitation be applied when the motor is first started, a counter torque would be developed due to the excitation and as a result the motor probably would not accelerate. Further, should the field excitation be applied before the motor has attained approximately 90 per cent of synchronous speed, the motor might not pull into synchronism and would probably slow down and run at a reduced speed, taking a heavy fluctuating current.

It will also be understood that it is very necessary to remove the field excitation should the motor pull out of step, since it is impossible for the motor to pull itself back into synchronism with the field windings excited.

In one of its aspects, my invention contemplates the provision of a control system for a synchronous motor whereby the field excitation will be so controlled that it will not be applied during the starting period until the motor had obtained substantially synchronous operating conditions. Moreover my control system provides that the field excitation will be removed in the event the motor pulls out of step and will not be reapplied until after the motor has been restored to a condition suitable for field excitation.

In carrying my invention into effect in one form thereof, I provide means for controlling the excitation of the synchronous motor and further cause my control means to respond to some suitable motor operating condition, as for instance the motor current demand, so that the motor field will not be applied until after the motor has attained substantially synchronous operating conditions and will be removed when the motor is operating under a synchronous condition. Moreover, in order to assure the application of the field at the proper time, I cause my control means to respond to a suitable time interval so that the field will not be applied until after a predetermined interval of time upon the motor attaining substantially synchronous operating conditions.

For a more complete understanding of my invention reference should be had to the accompanying drawing, the single figure of which is a diagrammatic representation of a system of control embodying my invention.

Referring to the drawing I have shown my invention in one form in connection with an alternating current synchronous motor. It will be understood that the synchronous motor 10 is provided with a suitable three phase armature winding on its stator member together with field windings mounted on a rotor member. It is believed unnecessary for a proper understanding of this invention to illustrate in detail the disposition of these windings since any preferred well-known arrangement may be employed. As shown, a suitable three phase source of alternating current supply 11 is provided for the armature winding of the motor, and a suitable direct current source of supply 12 is provided for exciting the field windings of the motor. In order to control the power connections for the synchronous motor, a suitable switch 13, shown as an electro-responsive switch, is interposed in the connections leading to the synchronous motor from the alternating current supply source 11. Likewise, in order to control the excitation of the motor field windings, a suitable control switch 14, shown as an electro-responsive switch, is inserted in the connections leading to the field windings from the direct current supply source 12. A suitable switch 15 is provided for controlling the energization and deenergization of the operating coil for the switch 13 whereby the switch may be opened and closed as desired.

It will be understood that in the starting operation the synchronous motor 10 will be operated as an induction motor. It will be further understood that during the starting period, the field windings will be either connected in an open circuit or connected in a closed circuit with a suitable discharge resistor. When the motor has been brought up substantially to its synchronous speed the field windings will be energized so as to cause the motor to pull itself into synchronism.

As shown, a suitable discharge resistor 16 is provided to be connected in a local circuit with the field windings during the starting period. The field contactor 14 is provided with an interlock 17 so arranged that when the contactor is open, the field winding local circuit will be completed and when the contactor is closed so as to effect an energization of the field windings, the field winding local circuit will be interrupted.

I provide suitable means for controlling the excitation of the field windings so that they will not be excited until after the motor has been brought substantially into synchronism and further so that the field windings will be deenergized in the event the motor pulls out of step. I cause my control means to respond to a suitable motor operating condition, as for example, the current demand of the motor, and further cause my control means to respond to a time interval.

It will be understood that the value of current selected will be that supplied to the motor when it is operating normally at substantially synchronous speed for, as is well understood, the current supplied to the motor during the starting period and that supplied in case of pull out are greatly in excess of the current required for normal synchronous operation. Thus, when the current demand is above the selected value, the field windings will be deenergized, and after the current demand has attained the selected value, the field windings will be energized.

As shown, I provide a suitable control circuit for the operating coil of the electro-responsive switch 14 which when energized will operate the field contactor 14 to its closed position, whereby the local discharge circuit for the field windings will be interrupted and their exciting connections will be established. I control this circuit by means of an instantaneous overload relay 20 and a suitable time element switching mechanism 21, both of which are shown as connected in the control circuit. As shown, the relay 20 is normally biased to its closed position and will not be opened except in response to current value above that normally supplied to the motor. The time element switching mechanism 21 is normally biased to its open position and, as shown, is provided with a suitable dash pot 22. The dash pot 22 is so arranged that when the operating coil for the switch 21 is energized the switch will close after a predetermined time interval and further so arranged that it will permit the switch to open instantaneously in the event the operating coil of the switch is deenergized. It will be understood that this time interval may be adjusted to any desired value by means of any suitable dash pot regulating means. It will be observed that the control switch 13 is provided with an interlock 23 connected in the control circuit and so arranged that when the switch 13 is open the interlock will be open and when the switch is closed the interlock will be closed. Thus, it will be impossible to energize the field windings with the control switch in its open position.

I conveniently employ the relay 20 not only as controlling means for the field contactor 14 but also as a means for initiating the operation of the time element switch 21. It will be observed, assuming the control switch 13 to be closed, that when the relay 20 is closed, an energizing circuit will be established for the switch 21 whereby it will close after a predetermined interval of time. Moreover, should the relay 20 be opened the operating circuit for the switch 21 will be deenergized whereby the switch will instantly move to its open position.

The operation of my control system is as follows: Let it be assumed that the switch 15 has been operated to close an energizing circuit for the operating coil of the controlling switch 13. It will be observed that this switch will then be moved to its closed position thereby interconnecting the motor 10 with the alternating current source of supply 11. It will also be observed that the control switch will close its associated interlock 23, which operation produces no controlling action of the motor at this time but makes it possible to energize the operating coil of the field contactor 14 by proper operation of the switches 20 and 21. It will be understood that this is merely a safety feature in that it will be impossible to apply excitation to the field windings of the machine in the event the line switch 13 is open.

It will be understood that during the accelerating period the current supplied to the motor will be very high as compared with the normal value of current supplied and as a result, the relay 21 will be held in its open position during this period. This current, however, will be gradually reduced as the motor speed is increased and when the motor has approached approximately its synchronous speed it will have been reduced to such a value that the relay 20 will close. It will be observed that when the relay 20 has been closed, an energizing circuit for the operating coil of the time element switch 21 will be completed from the upper conductor of the excitation source 12, through the interlock 23, the closed relay 20, and thence through the operating coil of the switch 21 to the lower conductor of the excitation source 12. The operation of the timing switch 21 will then be initiated and it will close in an interval of time after the closing of the relay 20, which time interval will be suitably adjusted by means of the dashpot 22. When the switch 21 has been closed, it will be observed that the control circuit for the operating coil of the field contactor 14 will be energized. This circuit may be traced from the upper conductor of the excitation source 12, through the interlock 23, the relay 20, the switch 21, and thence through the operating coil of the field contactor to the lower conductor of the excitation source 12. As a result of this operation the field contactor 14 will be closed to thereby effect an excitation of the motor field windings.

It will be observed that it will be impossible to energize these field windings unless both of the switches 20 and 21 are closed. It will also be observed that it will be impossible for the switch 21 to be closed unless the switch 20 is closed and further that it will be impossible for the switch 20 to be closed when the current supplied to the motor is above the predetermined selected value, which as has been stated, is selected to be the normal current demand of the motor.

If at any time during the operation of the motor the current demand has increased to such a value that the relay 20 will open, the switch 21 will immediately open to effect a deenergization of the contactor 14. As a result of this operation, the excitation will be removed instantly from the motor field windings. Thus, for example, should the synchronous motor pull out of step for any reason, the current demand for the motor will immediately increase to such a value that the relay 20 will be operated to effect a deenergization of the field windings. It will also be observed that it will be impossible to restore the excitation of the field windings until the abnormal operating condition which has effected their deenergization has been stabilized. Thus in the case illustrated, that is, in case the motor should have been pulled out of step, it will be impossible to effect an energization of the field windings until the motor has been put back into a condition ready for field excitation. The current demand of the motor will be a measure of its abnormal operating condition and when this condition has been so alleviated that the field excitation may be safely applied, the current demand will be of such a value that the relay 20 will operate to effect an energization of the field windings after a time interval, which interval will be controlled by the timing mechanism 21. Thus, it is impossible to excite the field windings except at the proper times both during the starting and running periods of the motor.

It will be obvious that the overload relay 20 may be used merely to control the energization of the operating coil of the switch 21, the switch 21 together with the interlock 23 performing the function of directly controlling the energizing circuit for the contactor 14. It will be observed that in this case the proper sequence of operation of the relay 20, the switch 21 and the field contactor 14 will be obtained. That is, the switch 20 will operate responsively to the current demand and when closed will effect an energization of the switching mechanism 21 which, after a predetermined interval of time, will operate to close the field contactor 14 and thus effect an energization of the motor field windings.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the appended claims.

What I claim as new and desire to secure by Letters Patent of the United States, is:

1. In combination with an alternating current supply circuit, a synchronous motor having its armature winding connected to said supply circuit, a source of excitation for said motor and means for effecting while the motor armature winding remains connected to the supply circuit the disconnection of the motor field winding from said source of excitation when the motor is pulled out of synchronism and the reconnection of said motor field winding to said source of excitation when said motor again reaches substantially synchronous speed including a time relay biased to its open position and operated to a closed position when energized for a predetermined interval, an energizing circuit for said relay, means controlled by said relay for connecting said source to the motor field winding when said relay is in its closed position, and a relay responsive to the armature current of said motor for opening the circuit of said time relay whenever said motor is pulled out of synchronism and for effecting the closing of said circuit when said motor again reaches substantially synchronous speed.

2. In combination with an alternating current supply circuit, a synchronous motor, switching means for connecting the armature winding of said motor to said supply circuit, a source of excitation for said motor and means for effecting while said switching means maintains the motor armature winding connected to the supply circuit the disconnection of the motor field winding from said source of excitation when the motor is pulled out of synchronism and the reconnection of said motor field winding to said source of excitation when said motor again reaches substantially synchronous speed including a time relay biased to its open position and operated to a closed position when energized for a predetermined interval, an energizing circuit for said relay, means controlled by said switching means for controlling said energizing circuit so that it is closed only when the motor armature is connected to the supply circuit, means controlled by said relay for connecting said source to the motor field winding when said relay is in its closed position, and a relay responsive to the armature current of said motor for opening the circuit of said time relay whenever said motor is pulled out of synchronism and for effecting the closing of said circuit when said motor again reaches substantially synchronous speed.

In witness whereof, I have hereunto set my hand this 31st day of October, 1928.

BENJAMIN W. JONES.